United States Patent
Leo et al.

(10) Patent No.: US 10,414,179 B2
(45) Date of Patent: Sep. 17, 2019

(54) SYSTEM FOR CONVEYING OBJECTS FROM A NESTED STACK OF OBJECTS TO A PRINTER FOR PRINTING

(71) Applicant: Xerox Corporation, Norwalk, CT (US)

(72) Inventors: Michael F. Leo, Penfield, NY (US); Wayne A. Buchar, Bloomfield, NY (US); Brendan C. Casey, Webster, NY (US); Daniel J. McVeigh, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/127,841

(22) Filed: Sep. 11, 2018

(65) Prior Publication Data

US 2019/0001717 A1    Jan. 3, 2019

Related U.S. Application Data

(62) Division of application No. 15/591,263, filed on May 10, 2017, now Pat. No. 10,124,614.

(51) Int. Cl.
| | | |
|---|---|---|
| *B41J 3/407* | (2006.01) | |
| *B41J 25/00* | (2006.01) | |
| *B65G 59/10* | (2006.01) | |

(52) U.S. Cl.
CPC ........... *B41J 25/001* (2013.01); *B41J 3/4073* (2013.01); *B65G 59/107* (2013.01)

(58) Field of Classification Search
CPC .... B65G 59/10; B65G 59/101; B65G 59/102; B65G 59/103; B65G 59/105; B65G 59/106; B65G 59/107; B65G 59/108; B65G 59/12; B41J 3/4073
See application file for complete search history.

(56) References Cited

U.S. PATENT DOCUMENTS

| | | |
|---|---|---|
| 1,634,566 A | 7/1927 | Wessman |
| 2,374,168 A | 4/1945 | Bowman |
| 2,385,267 A | 9/1945 | Franz |
| 2,433,736 A | 12/1947 | Carew |
| 2,497,718 A | 2/1950 | Earley et al. |
| 2,517,532 A | 8/1950 | Carew et al. |
| 2,526,014 A | 10/1950 | Ferber |
| 3,032,237 A | 5/1962 | Erickson |
| 3,098,585 A | 7/1963 | Giepen |
| 3,506,156 A | 4/1970 | Hanson et al. |
| 3,661,282 A * | 5/1972 | Buhayar ................ B41F 17/28 101/40 |
| 3,741,410 A | 6/1973 | Henschke et al. |
| 3,862,702 A | 1/1975 | Johnson et al. |

(Continued)

*Primary Examiner* — Scott A Richmond
(74) *Attorney, Agent, or Firm* — Maginot Moore & Beck LLP

(57) ABSTRACT

A printer includes a conveyor that feeds objects from a stack of nested objects to the printer. The conveyor includes a member having protuberances that extend from the member to hold the lips of objects in the stack except for the object closest to the printheads in the printer. A spindle mounted to a member is moved to be within an orifice of the object closest to the printheads to engage that object and pull it from the stack. The spindle rotates to facilitate the printing of the object. After the object is printed, it is released from the spindle and gravity directs the printed object along a ramp to an opening in the printer for collection.

19 Claims, 4 Drawing Sheets

(56) References Cited

U.S. PATENT DOCUMENTS

| | | | |
|---|---|---|---|
| 3,977,318 A * | 8/1976 | Cohan | B41F 17/28 |
| | | | 101/40.1 |
| 4,288,003 A | 9/1981 | Fries, Jr. | |
| 4,341,375 A | 7/1982 | Romanin | |
| 4,418,837 A | 12/1983 | Kontz | |
| 4,531,559 A | 7/1985 | Glasgo | |
| 4,805,758 A * | 2/1989 | Dominico | B41F 17/28 |
| | | | 198/444 |
| 4,943,207 A | 7/1990 | Provan et al. | |
| 5,064,093 A | 11/1991 | Davis et al. | |
| 5,622,248 A | 4/1997 | Villaverde, Sr. et al. | |
| 5,682,816 A * | 11/1997 | van der Griendt | B41F 17/20 |
| | | | 101/37 |
| 6,623,236 B1 | 9/2003 | Barnes | |
| 6,907,823 B2 * | 6/2005 | Gelbart | B41F 17/22 |
| | | | 101/37 |
| 2003/0015105 A1 | 1/2003 | Dewig et al. | |
| 2005/0046648 A1 | 3/2005 | Dumenil | |
| 2007/0284388 A1 | 12/2007 | Liao | |
| 2008/0105584 A1 | 5/2008 | Cecil | |
| 2009/0077928 A1 | 3/2009 | Ismael | |
| 2010/0091054 A1 * | 4/2010 | Vesanto | B41J 3/4073 |
| | | | 347/9 |
| 2013/0160402 A1 | 6/2013 | Zambelli | |
| 2015/0197404 A1 | 7/2015 | Gerber | |

* cited by examiner

SYSTEM FOR CONVEYING OBJECTS FROM A NESTED STACK OF OBJECTS TO A PRINTER FOR PRINTING

PRIORITY CLAIM

This application is a divisional application of and claims priority to U.S. patent application Ser. No. 15/591,263, which is entitled "System For Conveying Objects From A Nested Stack Of Objects To A Printer For Printing," which was filed on May 10, 2017, and which issued as U.S. Pat. No. 10,124,614 on Nov. 13, 2018.

TECHNICAL FIELD

This disclosure relates generally to a system for printing on three-dimensional (3D) objects, and more particularly, to systems for printing on objects removed from a nested stack of objects.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of various teams followed in the area. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2D) media printing technology, to apply image content onto three-dimensional objects is difficult. The difficulties are especially compounded when the objects are nested in a stacked arrangement for storage as is the case in plastic cups and the like. One object at a time needs to be removed from the stacked configuration of objects for printing and the run of objects to be printed may be short as a customer only needs two or four of the objects printed with some custom pattern. Therefore, printing systems capable of being operated in non-production environments that can print nested 3D objects are unknown, but desirable.

SUMMARY

A new printing system is configured to print the surface of nested three-dimensional (3D) objects one object at a time. The printing system includes a plurality of printheads, each printhead in the plurality of printheads being configured to eject marking material, a conveyor configured to move a stack of nested objects toward the plurality of printheads, the conveyor including a member having a plurality of protuberances that extend from the member to engage a portion of each object in the stack of nested objects except the object closest to the plurality of printheads, a spindle configured for reciprocal movement, an actuator operatively connected to the spindle to enable the actuator to move the spindle within an orifice of the object in the stack of nested objects that is closest to the plurality of printheads to engage the object and to move the object to a position opposite the plurality of printheads, and a controller operatively connected to the plurality of printheads, the conveyor, and the actuator. The controller is configured to operate the conveyor to move at least a portion of the stack of nested objects within the printing system, to operate the actuator to move the spindle within the orifice of the object in the stack of nested objects that is closest to the plurality of printheads to engage the object, remove the object from the stack, and move the object to a position opposite the plurality of printheads, and to operate the plurality of printheads to eject marking material onto the object on the spindle.

Another embodiment of the new printing system includes a plurality of printheads, each printhead in the plurality of printheads being configured to eject marking material, a conveyor configured to move a stack of nested objects toward the plurality of printheads, a spindle configured for reciprocal movement, an actuator operatively connected to the spindle to enable the actuator to move the spindle within an orifice of the object in the stack of nested objects that is closest to the plurality of printheads to engage the object, an opening positioned below the conveyor, a member having a first end and a second end, the first end of the member is positioned at the opening and the second end is positioned to receive objects released from the spindle, and a controller operatively connected to the plurality of printheads, the conveyor, and the actuator. The controller is configured to operate the conveyor to move at least a portion of the stack of nested objects within the printing system, to operate the actuator to move the spindle within the orifice of the object in the stack of nested objects that is closest to the plurality of printheads to engage the object, remove the object from the stack, and move the object to a position opposite the plurality of printheads, to operate the plurality of printheads to eject marking material onto the object, and to operate the actuator to release the object from the spindle in response to printing of the object being completed to enable gravity to direct objects to the first end of the member and along a length of the member to the second end and through the opening.

A new method of printing the surface of nested three-dimensional (3D) objects one object at a time includes operating a conveyor with a controller to position protuberances on a member within the conveyor between portions of adjacent objects in a stack of nested objects on the conveyor and to move at least a portion of the stack of nested objects within a printing system, operating an actuator with the controller to move a spindle within an orifice of an object in the stack of nested objects that is closest to a plurality of printheads to engage the object, remove the object from the stack, and move the object to a position opposite the plurality of printheads, and operating the plurality of printheads with the controller to eject marking material onto the object on the spindle.

BRIEF DESCRIPTION OF THE DRAWINGS

The foregoing aspects and other features of a printing system that prints surfaces of nested 3D objects one object at a time are explained in the following description, taken in connection with the accompanying drawings.

DETAILED DESCRIPTION

Figure 1:
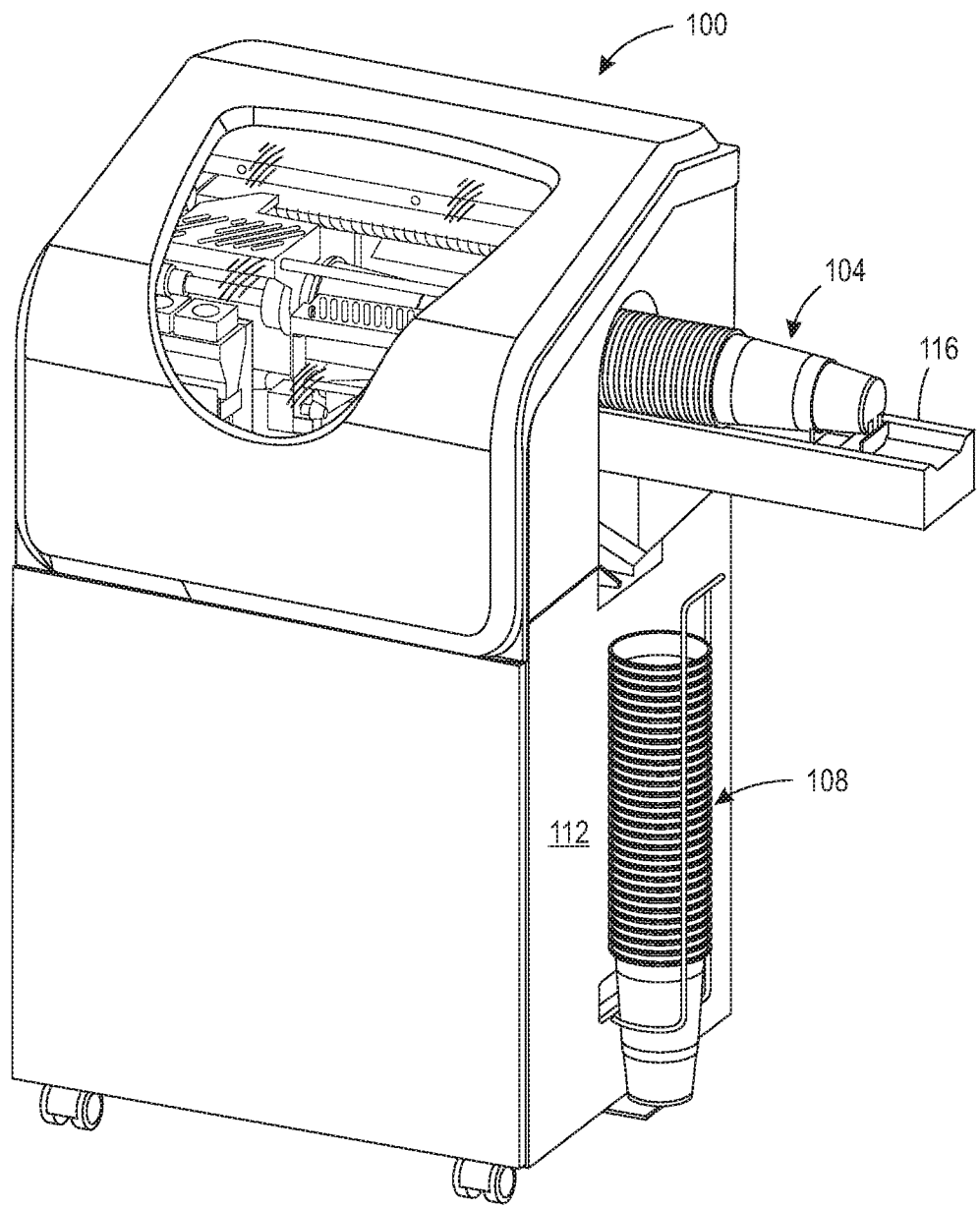
FIG. 1 illustrates an upright printing system to feed objects from a nested stack of objects to the system for printing.

For a general understanding of the present embodiments, reference is made to the drawings. In the drawings, like reference numerals have been used throughout to designate like elements.

Figure 2:
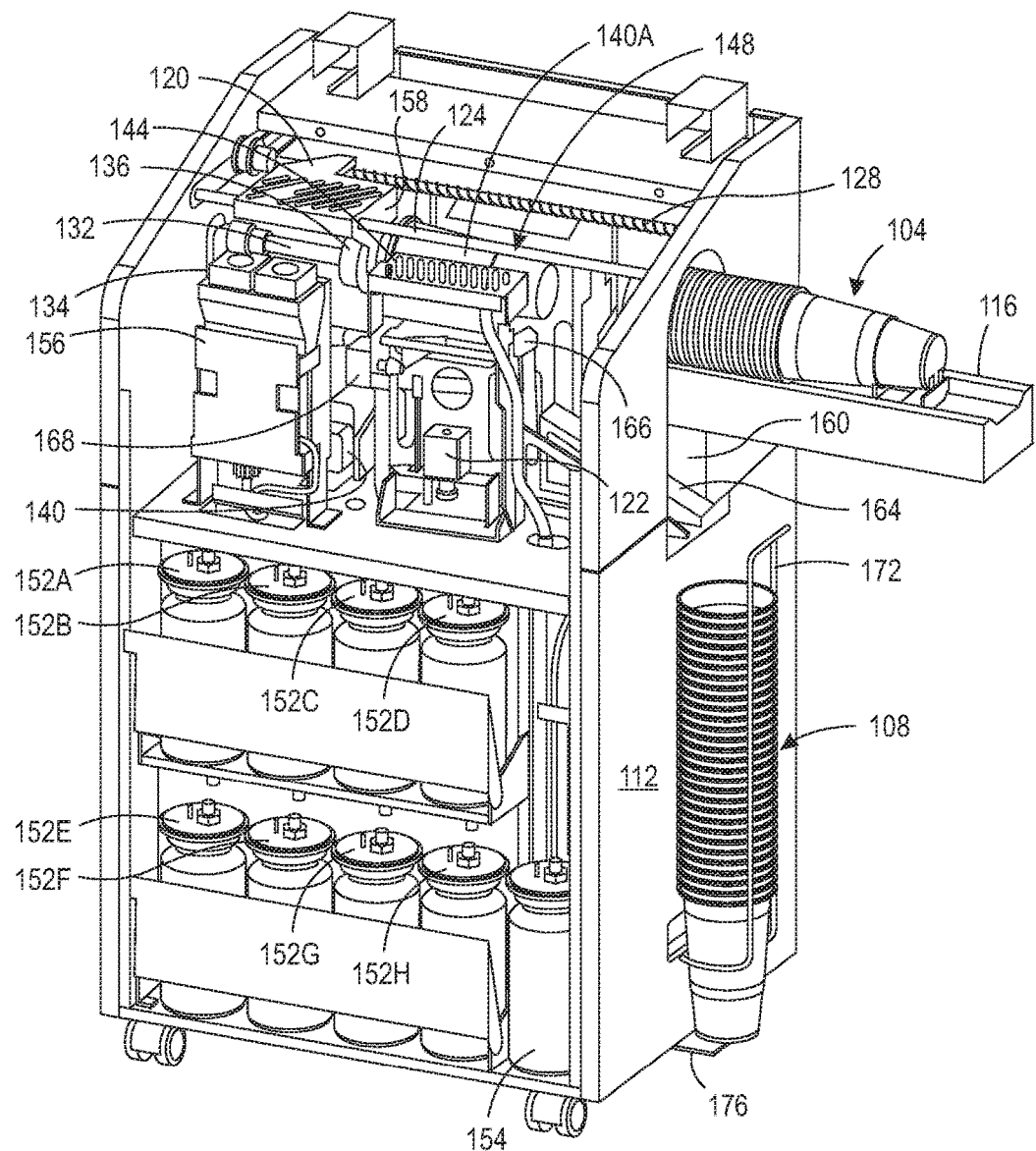
FIG. 2 is the printing system of FIG. 1 with the housing cover removed to expose the internal components that print and discharge the printed objects.

FIG. 1 depicts a printing system 100 configured to retrieve an object from a stack of nested objects 104, print the surface of the retrieved object, and discharge the printed object into a nested stack 108. The printing system 100 includes a housing 112 in which a printer is positioned as shown in FIG. 2 for the printing of objects. As depicted in the figure, the nested stack of objects is a stack of plastic cups although the nested stack can be of any objects capable of being nested together and that present an orifice at one end of the nested stack. The nested stack 104 is positioned within a conveyor 116 for translation into the housing 112. The details of the conveyor structure are presented below.

The internal components of the printing system 100 are shown in more detail in FIG. 2. A shuttle 120 is mounted on a support member 124 for reciprocating movement along the member. A fixed pitch screw member 128 is operatively connected to the shuttle 120 and an actuator 122 so the actuator can bidirectionally rotate the screw member 128 to move the shuttle bidirectionally along the member 124. The shuttle 120 is operatively connected to a rod 132 that terminates into a spindle 136. The rod 132 is hollow to provide a conduit that pneumatically connects spindle 136 to a vacuum source 140. As the spindle 136 travels with the shuttle 120 toward the stack 104, the spindle enters an orifice of the first object in the nested stack of objects in stack 104. One or more holes in the spindle 136 enables the vacuum source 140 to pull air from within the orifice of the first object and mate the interior of the object with the spindle 136.

When the actuator 122 is operated to reverse rotation of the screw member 128, the shuttle 120 returns to its home position, which positions the object 140A opposite two arrays of printheads 144 and 148, one on each side of the object. Each array 144 and 148 has four printheads, although fewer or more printheads can be configured within each array. The eight printheads in the two arrays 144 and 148 are operatively connected to ink supplies 152A to 152H, respectively, so each printhead is individually and independently supplied by only one ink supply in the system 100. Another container 154 is provided to a printhead maintenance system in the printer for the collection of waste ink from purging operations of the printheads. An actuator 134 operatively connected to the rod 132 rotates the rod so the spindle 136 rotates with the object 140A. The controller 156 operates the printheads within the printhead arrays 144 and 148 to print text and graphics onto the object 140A with up to eight different colors. After the object 140A is printed, a UV lamp 168, which is positioned below the printhead arrays 144 and 148, is operated by the controller 156 to cure the ink printed on the surface of the object 140A when one or more of the printheads used to print the surface of the object 140A ejected UV ink onto the surface of the object. Once the curing process is completed, the controller disconnects the vacuum source 140 from the rod 132 and the spindle 136 so the weight of the object dislodges the object from the spindle 136. In some embodiments, the position at which the spindle stops to position the object opposite the plurality of printheads is short of a mechanical stop 158. Once the printing of the object is completed, the controller operates the actuator to continue moving the object away from the stack so the edge of the object encounters the stop to push the object from the spindle as an alternative scheme for releasing the object from the spindle.

The lower portion of the opening 160 through which the conveyor 116 extends is located at one end of a ramp 164. The other end of the ramp 164 is operatively connected to an actuator 166 to move the other end of the ramp 164 toward and away from the trailing end of the object 140A positioned on the spindle 136. When an object is released from the spindle, gravity directs the object onto the ramp 164, which had its other end raised by the controller 156 operating the actuator 166 during the curing process. The object slides along the ramp 164 through the lower portion of the opening 160 and is aligned with previously ejected objects by the guide 172. A tab 176 is mounted to the housing 112 to support the stack of discharged objects within the guide 172. When a run of objects for a particular text and graphics pattern has been printed and discharged, the stack can be removed from the guide 172 so a stack of objects can be printed with another pattern of text and graphics.

Figure 3:
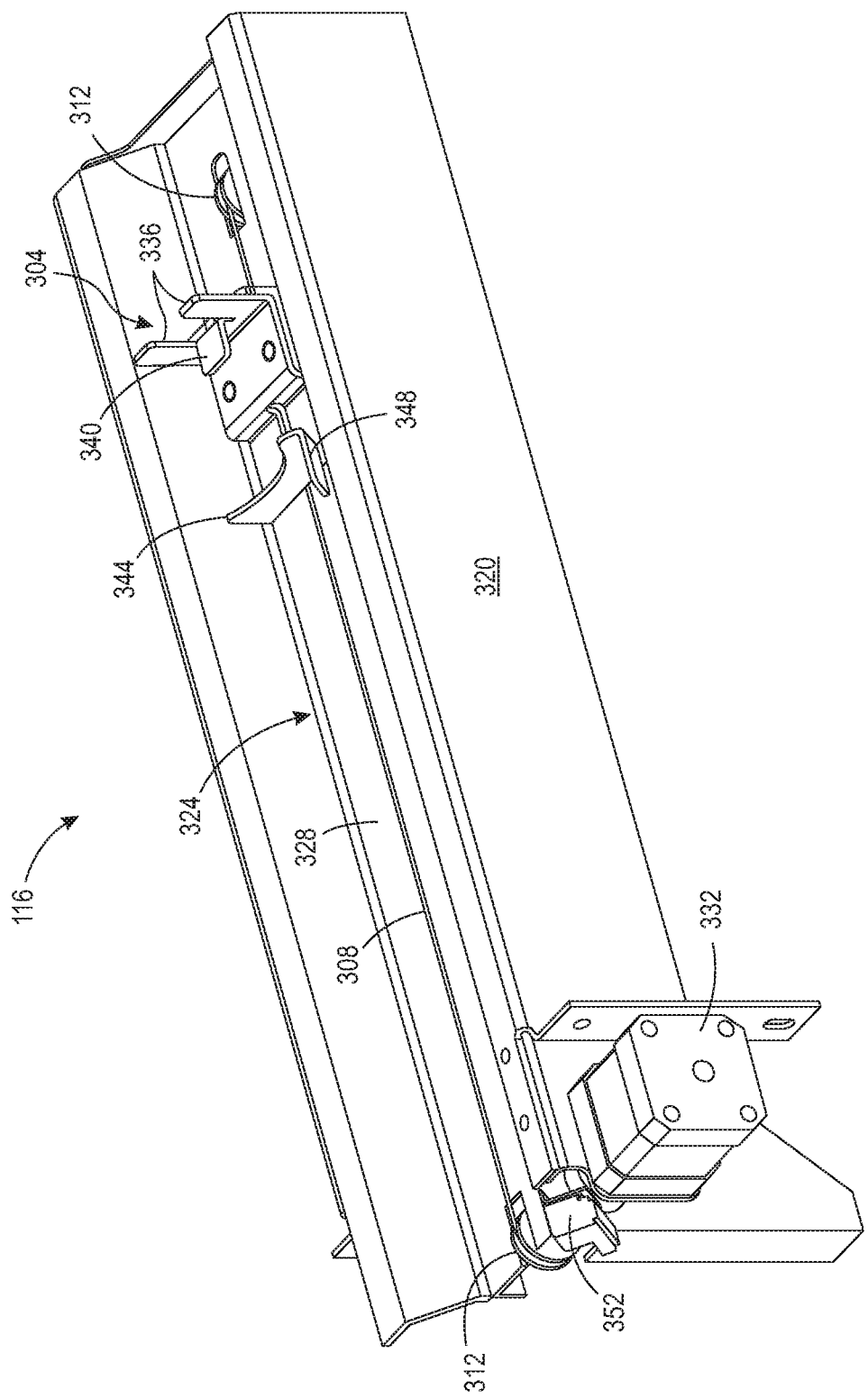
FIG. 3 is a side perspective view of the conveyor that moves a stack of nested objects within the printing system of FIG. 1 for printing.

The conveyor 116 is shown in more detail in FIG. 3. The conveyor 116 includes a tray 320 having a channel 324 with a floor 328. A support bracket 304 is operatively connected to an endless belt 308 that is entrained about a pair of pulleys 312 so rotation of the pulleys moves the support bracket 304 bidirectionally within the channel 324 of the tray 320. One of the pulleys 312 is operatively connected to an actuator 332 for bidirectional rotational movement of the pulley. The support bracket 304 includes a pair of prongs 336 that support the bottom of a last object in a nested stack of objects and a centering tab 340 that fits within a well of the bottom of the last object in the stack. A curved support member 344 accommodates the curvature of the exterior surface of the last object in the stack and the member 344 terminates in a tab 348 that is parallel with a longitudinal wall of the channel 324. A sensor 352 is located at the end of the conveyor 116 that is positioned within the printing system 100. This sensor can be an optical sensor, a magnetic sensor, or a mechanical sensor. The sensor 352 is configured to detect the presence of tab 348 and generate an electrical signal indicative of tab 348 being opposite the sensor. The controller 156 is operatively connected to the sensor 352 to receive the signal generated by the sensor when tab 348 is positioned at the sensor and, in response, the controller operates the actuator 332 to reverse the rotational direction of the pulley 312 to return the bracket 304 to the other pulley 312 so another stack of objects can be loaded into the conveyor 116 against the bracket 304.

Figure 4:
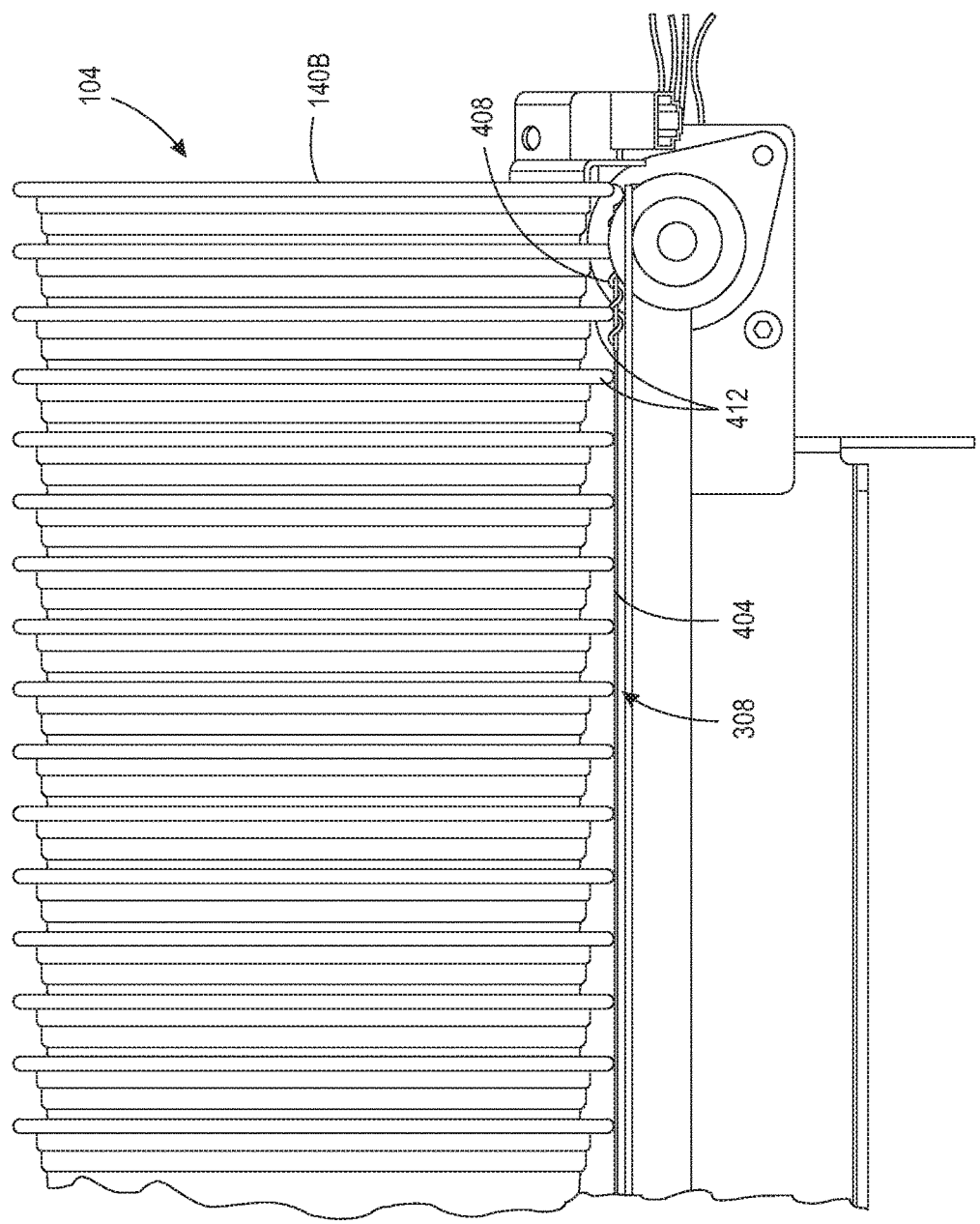
FIG. 4 is a side view of the conveyor shown in FIG. 3 that illustrates the interaction of the helical belt of the conveyor with the nested objects in a stack of nested objects.

FIG. 4 shows the interaction between the objects in the nested stack of objects 104 and the endless belt 308. Endless belt 308 includes an endless cable or wire 404 helically wrapped with a wire 408 at a fixed pitch along the entire length of the wire 404. The helically wrapped wire 408 is only shown at one end of the wire 404 to facilitate the figure. The portions of the wire 408 that are positioned between lips 412 of the objects help hold the objects in the stack. When the object 140B at the end of the stack reaches the end of the conveyor where the spindle can contact the orifice in the object, the wire 408 follows the wire 404 and falls away from the lip of the object 140B within the printing system 100. Thus, no portion of the wire 408 hinders the most forward object 140B in the tray 324 from being removed from the stack 104. When the spindle 136 (FIG. 2) enters the orifice of the object 140B and the vacuum flowing through the opening in the spindle pulls the interior of the object into engagement with the spindle, the reverse movement of the shuttle 120 and the spindle 136 removes the object 140B from the stack. The helically wound wire 408, however, provides enough resistance to translation of the remaining objects in the stack that they remain in the conveyor 116 until the actuator 332 advances the pulley 312 enough that the wire 408 no longer engages the lip of the most forward object so that object can be removed once the object currently printed has been ejected.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printing system comprising:
   a plurality of printheads, each printhead in the plurality of printheads being configured to eject marking material;
   a conveyor configured to move a stack of nested objects toward the plurality of printheads,
   a spindle configured for reciprocal movement;
   a first actuator operatively connected to the spindle to enable the first actuator to move the spindle within an orifice of the object in the stack of nested objects that is closest to the plurality of printheads to engage the object;
   an opening positioned below the conveyor;
   a member having a first end and a second end, the first end of the member is positioned at the opening and the second end is positioned to receive objects released from the spindle;
   a second actuator operatively connected to the second end of the member to move the second end of the member toward and away from the spindle; and
   a controller operatively connected to the plurality of printheads, the conveyor, and the first actuator, the controller being configured to operate the conveyor to move at least a portion of the stack of nested objects within the printing system, to operate the first actuator to move the spindle within the orifice of the object in the stack of nested objects that is closest to the plurality of printheads to engage the object, remove the object from the stack, and move the object to a position opposite the plurality of printheads, to operate the plurality of printheads to eject marking material onto the object, and to operate the first actuator to release the object from the spindle in response to printing of the object being completed to enable gravity to direct objects to the first end of the member and along a length of the member to the second end and through the opening.

2. The printing system of claim 1, wherein the first actuator operatively connected to the spindle is further configured to rotate the spindle and the object on the spindle as the controller operates the plurality of printheads to eject marking material on the object.

3. The printing system of claim 2, the conveyor further comprising:
   a member having a plurality of protuberances that extend from the member to engage a portion of each object in the stack of nested objects except the object closest to the plurality of printheads.

4. The printing system of claim 3 wherein the member of the conveyor is an endless wire entrained about a pair of pulleys within the conveyor; and the member further comprises:
   a second wire helically wrapped around a length of the endless wire at a fixed pitch to form the protuberances.

5. The printing system of claim 4 further comprising:
   a third actuator operatively connected to one of the pulleys to move the endless wire about the pulleys.

6. The printing system of claim 5, the conveyor further comprising:
   a bracket mounted to the endless wire to enable the bracket to move between the pulleys and move the stack of nested objects.

7. The printing system of claim 6, the conveyor further comprising:
   a sensor mounted at one end of the conveyor that is closest to the plurality of printheads, the sensor being configured to generate an electrical signal in response to the bracket being opposite the sensor; and
   the controller is further configured to reverse operation of the other actuator to move the bracket to the pulley most distant from the plurality of printheads.

8. The printing system of claim 7 wherein the sensor is a mechanical sensor, an optical sensor, or a magnetic sensor.

9. The printing system of claim 8 further comprising:
   a vacuum source that is operatively connected to an opening in the spindle; and
   the controller is operatively connected to the vacuum source, the controller being further configured to operate the vacuum source in response to the spindle being within the orifice of the object closest to the plurality of printheads and to deactivate the vacuum source in response to printing of an object by the plurality of printheads being completed.

10. The printing system of claim 9 further comprising:
    a fixed pitch screw member that is parallel to and displaced from the conveyor and the spindle;
    a shuttle mounted about the fixed pitch screw member, the shuttle being operatively connected to the spindle;
    a fourth actuator operatively connected to the fixed pitch screw member; and
    the controller being operatively connected to the fourth actuator, the controller being further configured to operate the fourth actuator to rotate the fixed pitch screw member bidirectionally to move the spindle toward the stack of nested objects, remove the object from the stack of nested objects, and position the object opposite the printheads for printing of the object.

11. The printing system of claim 10 further comprising:
    a hollow rod connecting the shuttle to the spindle, the vacuum source being operatively connected to the hollow rod to enable the vacuum source to pull a vacuum through the spindle.

12. The printing system of claim 11 further comprising:
    an ultraviolet (UV) source of radiation; and
    the controller is operatively connected to the UV source of radiation, the controller being further configured to operate the UV source of radiation to cure UV ink ejected onto the object held by the spindle.

13. The printing system of claim 12 further comprising:
    a mechanical stop positioned along a path traversed by the spindle at a location that enables the mechanical stop to halt movement of the object as the object moves away from the stack of nested objects and the spindle continues to move away from the stack of nested objects to facilitate disengagement of the object from the spindle.

14. The printing system of claim 13 further comprising:
a guide positioned at the opening, the guide being configured to direct objects coming through the opening onto a stack of nested printed objects held by the guide.

15. A printing system comprising:
a plurality of printheads, each printhead in the plurality of printheads being configured to eject marking material;
a conveyor configured to move a stack of nested objects toward the plurality of printheads,
a spindle configured for reciprocal movement;
a first actuator operatively connected to the spindle to enable the first actuator to move the spindle within an orifice of the object in the stack of nested objects that is closest to the plurality of printheads to engage the object;
a housing in which the plurality of printheads, the spindle, and the first actuator are positioned;
an opening in the housing at a position below the conveyor; a member having a first end and a second end, the first end of the member is positioned at the opening and the second end is positioned to receive objects released from the spindle; and
a controller operatively connected to the plurality of printheads, the conveyor, and the first actuator, the controller being configured to operate the conveyor to move at least a portion of the stack of nested objects within the housing, to operate the first actuator to move the spindle within the orifice of the object in the stack of nested objects that is closest to the plurality of printheads to engage the object, remove the object from the stack, and move the object to a position opposite the plurality of printheads, to operate the plurality of printheads to eject marking material onto the object, and to operate the first actuator to release the object from the spindle in response to printing of the object being completed to enable gravity to direct objects to the first end of the member and along a length of the member to the second end and through the opening in the housing.

16. The printing system of claim 15 further comprising:
a vacuum source that is operatively connected to an opening in the spindle; and
the controller is operatively connected to the vacuum source, the controller being further configured to operate the vacuum source in response to the spindle being within the orifice of the object closest to the plurality of printheads and to deactivate the vacuum source in response to printing of an object by the plurality of printheads being completed.

17. The printing system of claim 16 further comprising:
a fixed pitch screw member that is parallel to and displaced from the conveyor and the spindle;
a shuttle mounted about the fixed pitch screw member, the shuttle being operatively connected to the spindle;
a second actuator operatively connected to the fixed pitch screw member; and
the controller being operatively connected to the second actuator, the controller being further configured to operate the second actuator to rotate the fixed pitch screw member bidirectionally to move the spindle toward the stack of nested objects remove the object from the stack of nested objects, and position the object opposite the printheads for printing of the object.

18. The printing system of claim 17 further comprising:
an ultraviolet (UV) source of radiation; and
the controller is operatively connected to the UV source of radiation, the controller being further configured to operate the UV source of radiation to cure UV ink ejected onto the object held by the spindle.

19. The printing system of claim 18 further comprising:
a guide positioned at the opening in the housing, the guide being configured to direct objects coming through the opening in the housing onto a vertical stack of nested printed objects held by the guide adjacent to the housing.

* * * * *